(12) United States Patent  (10) Patent No.: US 6,382,305 B1
Sano                       (45) Date of Patent:     May 7, 2002

(54) HEATING VENTILATION, AND AIR CONDITIONING UNIT FOR AUTOMOTIVE VEHICLES

(75) Inventor: Masahiro Sano, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/542,983

(22) Filed: Apr. 4, 2000

(30) Foreign Application Priority Data

Oct. 15, 1999  (JP) .......................................... 11-294189
Oct. 15, 1999  (JP) .......................................... 11-294190

(51) Int. Cl.⁷ ............................................... B60H 3/06
(52) U.S. Cl. ........................ 165/43; 165/202; 165/103; 454/160
(58) Field of Search ......................... 165/42, 43, 201, 165/202, 100, 103; 454/69, 143, 156, 121, 75, 126, 158, 160

(56) References Cited

U.S. PATENT DOCUMENTS

| | | | | |
|---|---|---|---|---|
| 4,802,405 A | * | 2/1989 | Ichitani et al. ............ | 165/42 X |
| 4,834,170 A | * | 5/1989 | Sakurada et al. ............. | 165/43 |
| 4,842,047 A | * | 6/1989 | Sakurada et al. ............. | 165/43 |
| 4,852,638 A | | 8/1989 | Hildebrand et al. .......... | 165/42 |
| 4,898,325 A | * | 2/1990 | Sakurada .................. | 165/42 X |
| 4,940,083 A | * | 7/1990 | Takenaka et al. ............ | 165/42 |
| 5,701,949 A | | 12/1997 | Yamaguchi et al. .......... | 165/42 |
| 5,735,338 A | * | 4/1998 | Chevroulet et al. ........... | 165/42 |

FOREIGN PATENT DOCUMENTS

| | | |
|---|---|---|
| JP | 6-18018 | 3/1994 |
| JP | 6-18021 | 3/1994 |
| JP | 8-132852 | 5/1996 |
| JP | 8-282248 | 10/1996 |
| JP | 9-99725 | 4/1997 |
| JP | 9-123748 | 5/1997 |
| JP | 9-267620 | 10/1997 |
| JP | 10-297249 | 11/1998 |
| JP | 11-78482 | 3/1999 |
| JP | 11-99820 | 4/1999 |
| JP | 11-235921 | 8/1999 |
| JP | 11-254942 | 9/1999 |

* cited by examiner

Primary Examiner—Ljiljana Ciric
(74) Attorney, Agent, or Firm—Foley & Lardner

(57) ABSTRACT

In an automobile heating, ventilation, and air conditioning unit, an air-purifying filter is slanted and arranged in an upstream air duct defined in a HVAC unit case, so that the upstream end of the filter is supported by an upper supporting portion fixedly connected to the unit case for supporting the evaporator core and so that the downstream end of the filter is located away from the lower end of the evaporator core. Foot vent ducts are partitioned and formed in the unit case, utilizing the dimensional difference between the evaporator and heater cores in both height and width dimensions. Temperature-adjustment ribs, slanted and inwardly extending from the inner periphery of the forward wall of the unit case above the heater core, are provided close to foot vent outlets, so that the foot vent outlets face to a space defined just downstream of the temperature-adjustment ribs.

10 Claims, 3 Drawing Sheets

HEATING VENTILATION, AND AIR CONDITIONING UNIT FOR AUTOMOTIVE VEHICLES

BACKGROUND OF THE INVENTION

1. Field of the Invention

The present invention relates to an automobile heating, ventilation, and air conditioning unit usually abbreviated to "HVAC unit" or to "HVAC module", and specifically to a one-box type automobile HVAC unit capable of being automatically controlled through either an electronic control unit (ECU) or an electronic control module (ECM), or a body control module or a body computer module (BCM).

2. Description of the Prior Art

In recent years, there have been proposed and developed various automobile heating, ventilation, and air conditioning (HVAC) systems whose automatic control can be achieved by an ECU/ECM coordinating all engine functions such as the fuel injection and ignition system or a BCM handling the functions of controlling such items as an electronic comfort control system or an electronic climate control system. A typical HVAC unit contained in the electronic climate control system (ECC system), is usually located substantially in the center of the front passenger compartment, and has at least a heating, ventilation, and air conditioning (HVAC) unit case, a blower fan unit, an evaporator core assembly, and a heater core assembly. The HVAC unit case defines therein an air mix chamber in which the evaporator core air (cold air introduced through a bypass air passage into the air mix chamber) and the heater core air (warm air) are properly blended, in dependence on the degree of air-mix-door opening. The amounts of blended air or conditioned air flowing through the vent outlet, the defroster outlet, and the foot vent outlets are adjusted by regulating the position of the respective control doors. The HVAC unit case has the vent, defroster, and foot vent outlets above the air mix chamber. On later model cars, in order to widen a foot space and a glove box of the front passenger compartment, an automotive HVAC unit of a comparatively short fore-and-aft dimension is often used. In such an automotive HVAC unit having a short fore-and-aft dimension, it is preferable to arrange an evaporator core assembly along a stream line of air discharged from a blower fan, so that the blower fan unit is less offset from the evaporator core assembly in the longitudinal direction of the vehicle. However, with this arrangement, there is a tendency that air discharged from the blower fan does not blow uniformly against the inflow face of the evaporator core. So, such a HVAC unit is equipped with a deflector vane in an air passage between the blower fan and the evaporator core to properly divert the course of a stream of air discharged from the blower fan by virtue of the deflector vane, so that uniform air blow against the inflow face of the evaporator is ensured. The use of the deflector vane results in increased air-flow resistance, thereby reducing a quantity of discharged air. The deflector vane itself functions as a factor for air-flow noise. Also, the provision of the deflector vane in the air passage between the blower and the evaporator complicates a mold structure for the HVAC unit case. Such HVAC units or HVAC systems have been disclosed in Japanese Patent Provisional Publication Nos. 9-99725, 9-267620, and 10-297249. Nowadays, for the purpose of health and cleanliness, the needs of addition of an air-purifying filter to the HVAC unit have built up. In general, the greater the durability or the air-purifying effect of the air-purifying filter, the larger the filter size. If an air-purifying filter as well as the previously-noted deflector vane is incorporated into the HVAC unit, an air-flow resistance (energy loss) may further increase during operation of the blower of the HVAC system. As a matter of course, a discharged-air quantity is also reduced. In addition to the above, in HVAC units, there is a possibility that part of cold air (evaporator core air) passing through the bypass air passage is undesiredly flown directly into the foot vent outlet. To prevent this, a so-called temperature-adjustment rib is often provided nearby the outlet of the bypass air passage. The temperature-adjustment rib is also effective to reduce fluctuations in temperature of air properly conditioned or temperature-adjusted within the air mix chamber. The provision of the temperature-adjustment rib results in increased air-flow resistance, thus somewhat reducing discharged-air quantity. In a similar manner as the deflector blade, the temperature-adjustment rib also functions as a factor for air-flow noise. The structure of a HVAC unit case having a temperature-adjustment rib as well as a deflector blade is more complicated. This increases total production costs of HVAC units. Furthermore, the foot vent duct, communicating the foot vent outlet, is usually fitted to the outer peripheral wall of the HVAC unit case so as to discharge or blow warm air into the foot space of the vehicle occupants. Although a rectangular cross section (or a boxy shape) is desirable as an ideal shape of the HVAC unit, the foot vent duct fitted to the outer peripheral wall of the HVAC unit serves as a factor for deformation of the whole shape of the HVAC unit case. This results in troublesome packaging.

SUMMARY OF THE INVENTION

Accordingly, it is an object of the invention to provide a heating, ventilation, and air conditioning unit for automotive vehicles that avoids the aforementioned disadvantages of the prior art.

It is another object of the invention to provide an air-purifying filter equipped automobile heating, ventilation, and air conditioning (HVAC) unit, being compact in size and light in weight, and ensuring uniform air blow against the inflow face of an evaporator core with an evaporator arrangement along a stream line of air discharged from a blower fan, and capable of reducing total air-flow resistance during operation of the blower while ensuring an adequate filtering area of an air-purifying filter.

It is a further object of the invention to provide an air-purifying filter equipped automobile heating, ventilation, and air conditioning (HVAC) unit, being compact in size and light in weight, and having a temperature-adjustment rib and a built-in foot vent duct structure, and enhancing installation flexibility.

In order to accomplish the aforementioned and other objects of the present invention, an automobile heating, ventilation, and air conditioning (HVAC) unit comprises a heating, ventilation, and air conditioning unit case permitting flow of interior air, a blower fan unit having at least a blower fan for introducing air into the unit case, an evaporator core assembly having an evaporator core disposed in the unit case for taking heat from the air discharged from the blower fan to produce cool air, a heater core assembly having a heater core disposed in the unit case downstream of the evaporator core for adding heat to the cool air to produce warm air, a bypass air passage bypassing the heater core, an air mix door disposed between the evaporator core and the heater core for controlling a percentage of the cool air passing through the bypass air passage and the warm air produced by the heater core, depending on a degree of opening of the air mix door, the unit case defining an upstream air duct in the unit case upstream of the evaporator core for routing the air discharged from the blower fan toward the evaporator core, and an air-purifying filter slanted and arranged in the upstream air duct, so that an upstream end of the air-purifying filter is supported by an upper supporting portion fixedly connected to the unit case for supporting the evaporator core and so that a downstream end of the air-purifying filter is located away from a lower end of the evaporator core.

According to another aspect of the invention, an automobile heating, ventilation, and air conditioning unit, comprises a heating, ventilation, and air conditioning unit case permitting flow of interior air, a blower fan unit having at least a blower fan for introducing air into the unit case, an evaporator core assembly having an evaporator core disposed in the unit case for taking heat from the air discharged from the blower fan to produce cool air, a heater core assembly having a heater core disposed in the unit case downstream of the evaporator core for adding heat to the cool air to produce warm air, a bypass air passage bypassing the heater core, an air-mix sliding door disposed between the evaporator core and the heater core for controlling a percentage of the cool air passing through the bypass air passage and the warm air produced by the heater core, depending on a degree of opening of the air-mix sliding door, and the unit case including a fan scroll casing accommodating the blower fan in the fan scroll casing, and a substantially rectangular parallelopiped portion extending in a downstream direction from an air outflow side of the fan scroll casing, the substantially rectangular parallelopiped portion being constructed by a pair of side walls, and a backward wall and a forward wall both connected to the side walls to form a U-turn air-flow passage, wherein the evaporator core is located upright at a U-turn portion of the U-turn air-flow passage, the heater core is dimensioned to be smaller than the evaporator core in both height and width dimensions and located upright and downstream of and substantially parallel to the evaporator core, and which further comprises at least one foot vent duct partitioned and formed in the unit case utilizing a dimensional difference between the evaporator core and the heater core and at least one temperature-adjustment rib inwardly projecting from an inner peripheral wall surface of the forward wall of the unit case above the heater core, and wherein the at least one temperature-adjustment rib is provided adjacent to a foot vent outlet communicating the at least one foot vent duct, so that the foot vent outlet faces to a space defined just downstream of the at least one temperature-adjustment rib.

DESCRIPTION OF THE PREFERRED EMBODIMENTS

Figure 1:
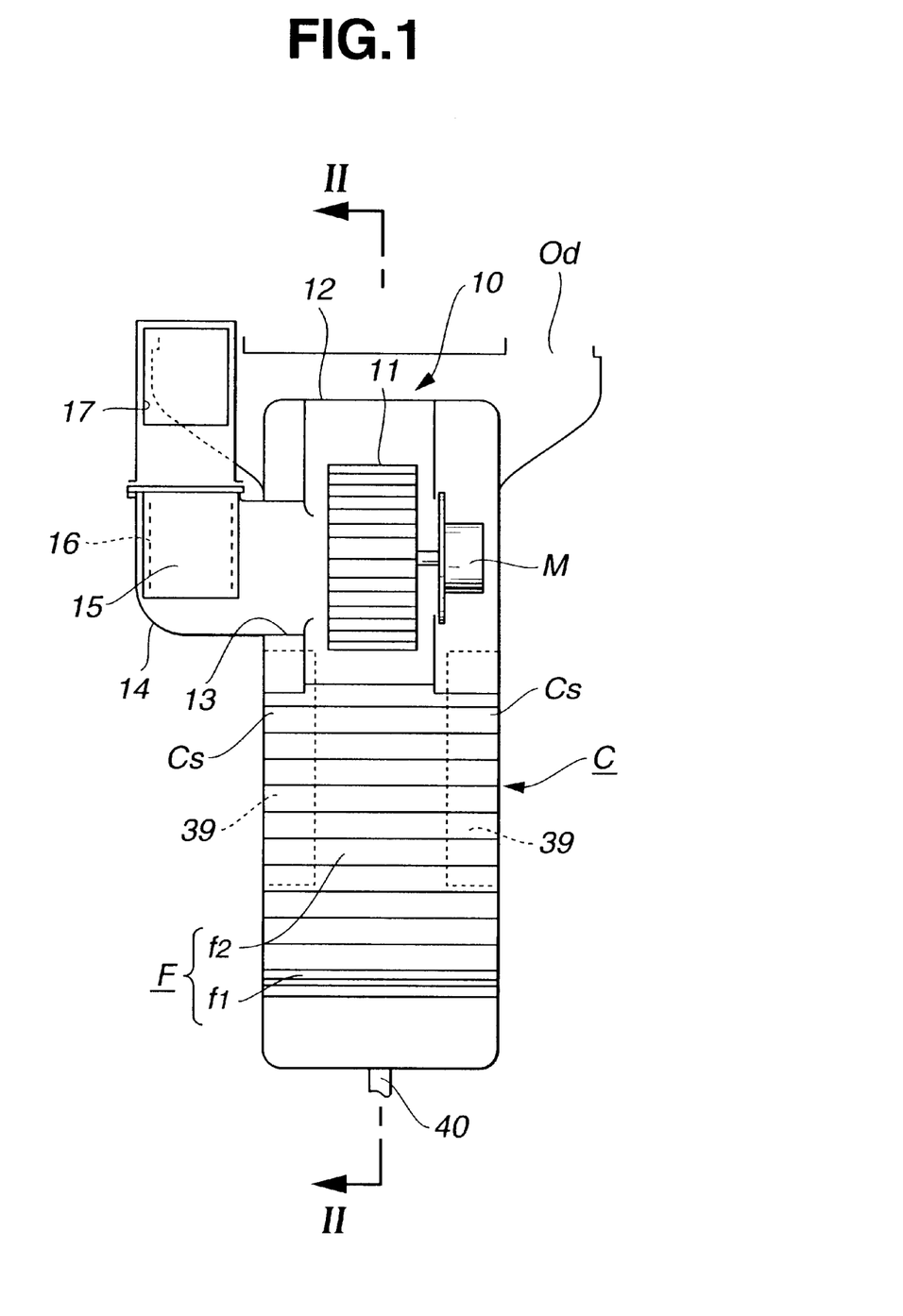
FIG. 1 is an elevation view illustrating one embodiment of an automobile heating, ventilation, and air conditioning (HVAC) unit of the invention, partly cross sectioned.
Figure 2:
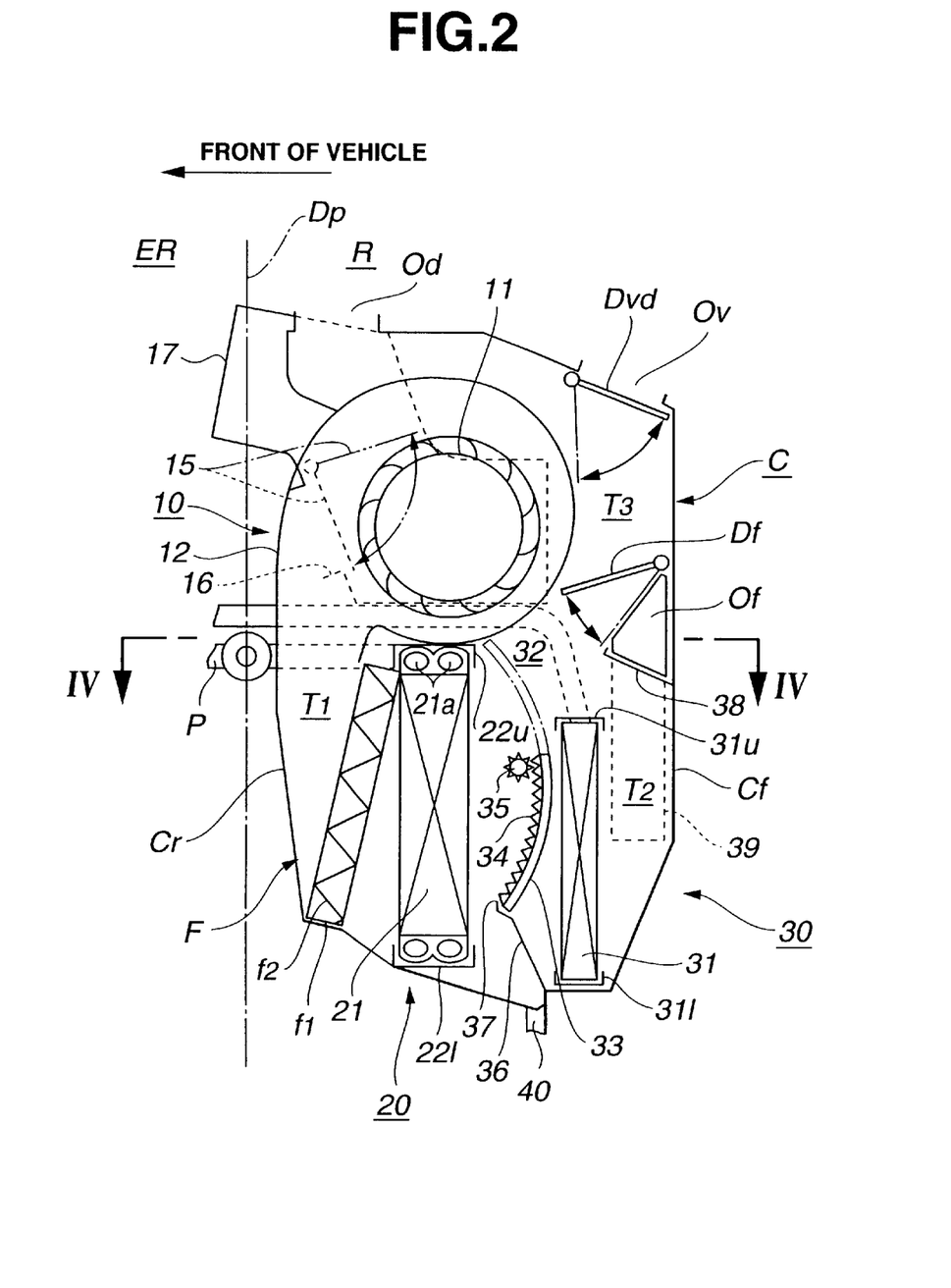
FIG. 2 is a longitudinal cross-sectional view illustrating the HVAC unit of the embodiment, taken along the line II—II of FIG. 1.
Figure 3:
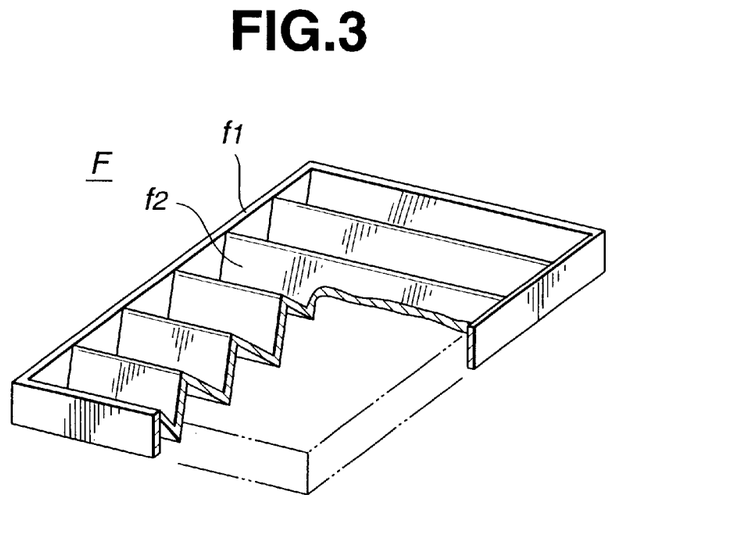
FIG. 3 is a perspective view illustrating an air-purifying filter element incorporated in the HVAC unit of the embodiment.

Referring now to the drawings, particularly to FIGS. 1 and 2, reference sign C denotes a casing of a heating, ventilation, and air conditioning (HVAC) unit, simply called a "HVAC unit case". The HVAC unit case C accommodates therein a blower fan unit 10 (containing a blower motor M and a blower fan or a scirocco fan or a centrifugal multiblade fan 11 driven by the motor M), an evaporator core 21 of an evaporator core assembly or a cooling unit 20, and a heater core 31 of a heating unit or a heater core assembly 30, from the upstream side of the flow of air discharged by the blower fan 11, in that order. The HVAC unit is located at the underside of the instrument panel of the vehicle and substantially in the center of the front passenger compartment. The HVAC unit case C is mounted on the dash panel (or the bulkhead) Dp partitioning the engine room ER from the vehicle compartment R. In more detail, as seen in FIG. 1, the blower fan unit 10 is located in the central upper portion of the HVAC unit case C. The centrifugal multiblade fan 11 is operably disposed in a volute fan scroll casing 12 included in the upper half of the HVAC unit case C. The air inflow side of the fan scroll casing 12 is integrally formed with an inside-air/outside-air switching box or an inside-air/outside-air switching duct 14. The inside-air/outside-air switching duct 14 is continuous with an air suction inlet 13 formed in one side wall Cs of the HVAC unit case C. The inside-air/outside-air switching box 14 is formed therein with a fresh-air/recirculation-air switching door 15 by means of which recirculation air flowing through an inside air inlet 16 or fresh air flowing through an outside air inlet 17 is selectively introduced into the fan scroll casing 12. On the other hand, the air outflow side of the fan scroll casing 12 is formed integral with a substantially rectangular parallelopiped, vertically extending portion. In other words, the HVAC case C includes the substantially rectangular parallelopiped portion extending in the downstream direction from the air outflow side of the fan scroll casing 12. The substantially rectangular parallelopiped portion is constructed by a pair of substantially parallel side walls (Cs, Cs), each having a smooth surface, a backward wall Cr, and a forward wall Cf. The backward wall Cr and the forward wall Cf are connected to the side walls to define a U-turn air-flow passage. The "backward" wall Cr and the "forward" wall Cf are named based on the orientation of the passenger compartment but not the orientation of the vehicle body. The side walls (Cs, Cs) and the backward wall Cr, constructing part of the substantially rectangular parallelopiped vertically extending portion of the fan scroll casing 12, define an upstream air duct T1 located upstream of the evaporator core 21. The side walls (Cs, Cs) and the forward wall Cf, constructing part of the substantially rectangular parallelopiped vertically extending portion of the fan scroll casing 12, define a downstream air duct T2 accommodating therein the heater core 31. The outer peripheral surface of the fan scroll casing 12 cooperates with the opposing side walls (Cs, Cs) and the forward wall Cf, to define a conditioned-air duct T3 (described later). The upstream air duct T1, the downstream air duct T2, and the conditioned-air duct T3 provides the previously-noted U-turn air-flow passage. As shown in FIG. 2, the evaporator core assembly 20 is located downstream of the blower fan unit 10 and disposed between the substantially parallel two side walls (Cs, Cs) (see FIGS. 2 and 4). In the shown embodiment, the evaporator core assembly 20 is located directly below the blower fan unit 10. The evaporator core assembly 20 has the evaporator core 21 (being rectangular in cross section) in which refrigerant changes from a liquid to a gas, taking heat from the surrounding air. As clearly seen in FIG. 2, the evaporator core 21 is arranged along a stream line of air flowing through the blower fan unit 10 and arranged substantially in parallel with the axial line of the upstream air duct T1, so that the blower fan unit 10 is less offset from the evaporator core assembly 20 and aligned with the evaporator core assembly in the vertical line of the HVAC unit. Thus, the air discharged from the blower fan 11 is guided by means of the upstream air duct T1, and then the course of its stream is routed toward the inflow face of the evaporator core 21. The evaporator core 21 can be formed as a deformed-pipe type, a laminated-tube type, or the like. In the shown embodiment, the laminated-tube type is used as the evaporator core 21. In the HVAC unit of the embodiment, the comparatively larger evaporator core 21 is located upright at the U-turn portion of the U-turn air-flow passage (the air ducts T1, T2, T3). The comparatively smaller heater core 31 is located upright and downstream of and substantially parallel to the evaporator core. Reference sign 21a denotes a tank portion of the evaporator core unit 20, connected to a refrigerant tube P. The upper and lower ends of the evaporator core 21 are fixedly supported on the HVAC unit case C by way of upper and lower supporting portions 22u and 22l both fixedly connected to or integrally formed with the HVAC unit case C. The upper and lower supporting portions 22u and 22l fixedly connected to or integrally formed with the HVAC unit case C enhance the rigidity of the HVAC unit case, thus increasing a withstand-load performance. Therefore, the HVAC unit case of the automobile HVAC unit of the embodiment, having such a comparatively high rigidity, can reliably support the blower fan unit 10 employing the relatively heavy blower motor M. The provision of the upper supporting portion 22u of the HVAC unit case C also enhances the rigidity of the blower fan unit 10 itself. This reduces undesirable beating noise or vibrations generated by rotation of the blower motor and also minimizes leakage of noise from the interior of the HVAC unit to the vehicle compartment, during operation of the blower fan. The enhanced rigidity of the blower fan unit 10 eliminates the necessity of additional stiffening ribs. Accordingly, the shape of the HVAC unit case C can be simplified. The evaporator core 21, provided at the underside of the blower fan unit 10, is also relatively heavy. In the supporting structure of the HVAC unit of the embodiment, the upper and lower ends of the evaporator core 21 can be reliably supported on the HVAC unit case C by the upper and lower supporting portions 22u and 22l firmly connected to the HVAC unit case C. This enhances the entire supporting rigidity for the blower fan unit 10, thus ensuring a quiet operation of the blower motor M. Actually, the evaporator core 21 is securely reliably supported by the upper and lower supporting portions 22u and 22l, such that the upper end of the evaporator core 21 is fitted into the upper supporting portion 22u, and the lower end of the evaporator core 21 is fitted into the lower supporting portion 22l. To achieve more precise temperature adjustment, it is preferable to interleave an air-leakage preventive packing (or a sealing device) between the upper supporting portion 22u and the upper end of the evaporator, and to interleave an air-leakage preventive packing (or a sealing device) between the lower supporting portion 22l and the lower end of the evaporator. In the HVAC unit of the embodiment, an air-purifying filter F is provided just upstream of the evaporator core 21, and the upper end of the filter F is supported on the upper supporting portion 22u together with the upper end of the evaporator core 21. In lieu thereof, the upper end of the filter F may be supported on the HVAC unit case C separately from or independently of the upper portion of the evaporator core 21. As best seen in FIG. 3, the air-purifying filter F is comprised of a frame portion f1 having a substantially rectangular cross section, and a filtering portion (filter element) f2 formed within the frame portion f1 and made of a corrugated or zigzag nonwoven fabric. The upstream end (or the upper end) of the frame portion f1 of the filter F is supported by or mounted on the upper supporting portion 22u which supports the upper end of the evaporator core 21, whereas the downstream end (or the lower end) of the frame portion f1 is supported by or mounted on the inner peripheral wall of the HVAC case C away from the lower supporting portion 22l of the evaporator core 21. As clearly shown in FIG. 2, forward and backward faces (inflow and outflow faces) of the filter F are slightly slanted with respect to the front face (the inflow face) of the evaporator core 21. The slightly-slanted filter F is formed as a full-face filter which covers the inflow face of the evaporator core 21. The filter angle of the filter F with respect to the evaporator inflow face is set at a predetermined acute angle which is effective to suppress diversion of the course of a stream of air discharged from the blower fan 11 toward the inside face of the fan scroll casing 12, while maintaining an increase in fluid-flow resistance of air flowing through the upstream air duct T1 at minimum. That is, although there is a tendency that air discharged from the blower fan 11 into the fan scroll casing 12 flows mainly along the inside face of the fan scroll casing, the slightly-slanted air-purifying filter F can suitably suppress the flow velocity of air flowing along the scroll-casing inside face, and as a result the discharged air from the blower fan 11 blows uniformly against the inflow face of the evaporator core 21. This prevents undesirable diversion of the discharged air from the blower fan toward the upper end (the upstream end) of the evaporator core. As set out above, the blower fan unit 10 is reliably supported by means of the evaporator core 21 and the upper and lower supporting portions 22u and 22l, and additionally the filter F is slantly installed on the upper supporting portion 22u. As a consequence, three parts, namely the filter F, the evaporator core 21, and the bottom panel of the HVAC unit case C cooperate with each other to form a triangular supporting structure for the blower fan unit 10. Accordingly, the blower fan unit 10 can be more reliably supported by means of both the evaporator core 21 and the filter F. Such a triangular supporting structure ensures an enhanced supporting rigidity for the blower fan unit 10 within the HVAC unit case C. This effectively reduces blower-fan motor noise and vibrations. As appreciated from the cross section of FIG. 2, air flowing through the upstream air duct T1 makes a U-turn toward the downstream air duct T2. That is, the discharged air from the blower fan first flows downwards through the upstream air duct T1, and then flows through the filter F and the evaporator core 21. Thereafter, as discussed hereunder, air (cold air) passing through the evaporator core flows upwards through the heater core 31 and/or a bypass air passage 32 via the downstream air duct T2. The heater core 31 is provided within the downstream air duct T2 to heat the evaporator core air (cool air) flowing through the evaporator and to produce heater core air (warm air). In a similar manner as the evaporator core assembly 20, the heater core assembly 30 is disposed between the side wall pair (Cs, Cs). When heat is needed, the blower fan 11 is turned on to circulate air through the hot heater core 31 through which hot engine coolant circulates. Similarly to installation of the evaporator core 21 on the HVAC unit case C, the heater core 31 is fixedly supported by upper and lower supporting portions 31u and 31l. In the shown embodiment, the upper and lower supporting portions 31u and 31l are fixedly connected to the HVAC unit. Alternatively, the two supporting portions 31u and 31l may be integrally formed with the HVAC unit. As seen in FIG. 2, the heater core 31 is disposed in the downstream air duct T2 so that the inflow face of the heater core 31 is substantially parallel to the outflow face of the evaporator core 21. In the shown embodiment, the evaporator core 21 and the heater core 31 are substantially symmetrical with each other in the lateral direction (see FIG. 4) of the HVAC unit case. Hitherto, a heater core was often arranged slantedly with respect to the outflow face of an evaporator core, with an increased fore-and-aft length of a HVAC unit. In comparison with the slanted heater-core arrangement, the parallel heater-core arrangement of the embodiment as well as the evaporator-core arrangement along the streamline of air flowing through the blower fan unit 10, contributes to reduction in the fore-and-aft dimension of the HVAC unit case C. For the purpose of temperature adjustment for conditioned air discharged from each outlet, an air mix door 33 is provided between the evaporator core 21 and the heater core 31. In the shown embodiment, a sliding door is used as the air mix door 33. The HVAC unit case C defines an air mix chamber in the downstream air duct T2 provided downstream of both the heater core 31 and the bypass air passage 32. Within the air mix chamber, the evaporator core air (cold air) introduced through the bypass air passage 32 and the heater core air (warm air) are properly blended or mixed in dependence on the degree of opening of the air mix door 33. In other words, the temperature adjustment for conditioned air discharged into the vehicle compartment is achieved by changing the ratio of the amount of warm air flowing through the heater core 31 to the amount of cold air flowing through the bypass air passage 32 by virtue of the air mix door 33. Except extremely cold-regions use, the amount of air passing through the heater core 31 is not so much. For this reason, the heater core 31, capable of providing a required heating power, can be generally small-sized in comparison with the size of the evaporator core 21, and whereby height and width dimensions of the heater core 31 can be decreased as compared to those of the evaporator core 21 (see cross sections of FIGS. 2 and 4). Additionally, the bottom of the heater core 31 is set at almost the same level as the bottom of the evaporator core 21. Owing to the dimension difference between the smaller heater core 31 and the larger evaporator core 21, the upper end of the heater core 31 can be disposed at a lower level than the upper end of the evaporator core 21. Therefore, it is possible to easily define the bypass air passage 32 (communicating the air mix chamber) in HVAC unit case C, without further lowering the bottom end of the heater core 31 than a level of the bottom end of the evaporator core 21, that is, without remarkably downwardly enlarging a part of the bottom face of the HVAC unit case C at a particular position corresponding to the bottom of the heater core 31. This realizes a compact simplified HVAC unit case having a substantially rectangular shape (a substantially boxy shape). The dimension difference between the relatively smaller heater core 31 and the relatively larger evaporator core 21 insures smooth flow of cold air flowing through the bypass air passage 32 toward a vent outlet Ov which will be fully described later. This enhances a cooling performance of the HVAC unit. As can be appreciated from FIGS. 2 and 4, in the HVAC unit of the embodiment, the heater core 31 is dimensioned to be smaller than the evaporator core 21 in both height and width dimensions, and additionally the relatively smaller heater core 31 is aligned with the relatively larger evaporator core 21 in the fore-and-aft direction of the HVAC unit case C. Thus, the HVAC unit of the embodiment has a pair of effectual spaces defined adjacent to the side walls (Cs, Cs) of the fan scroll casing 12 nearby both sides of the heater core 31 (see FIG. 4). Foot vent ducts 39 (which will be fully described later) are partitionedly formed and built in the effectual spaces defined adjacent to the side walls (Cs, Cs) of the fan scroll casing 12 nearby both sides of the heater core 31. Therefore, the HVAC unit case C can be formed as a compact boxy HVAC unit case of less uneven wall surfaces. This facilitates packaging for the HVAC unit.

On the other hand, as best shown in FIG. 2, the air mix door 33 is formed as a longitudinally-arc-shaped thin-walled sliding door. To adjust the air-mix-door opening, the door 33 is slidable upwards and downwards between the heater core 31 and the evaporator core 21. As may be appreciated from FIGS. 2 and 4, the sliding door 33 (the air mix door) has a pair of racks (34, 34) formed on its left-hand side concave surface (viewing FIG. 2) near both side edges. The two racks (34, 34) are meshed-engagement with respective pinion gears (35, 35) rotatably mounted on the HVAC case C and rotated by means of a pinion actuator (not shown). The installation position and the curvature of the sliding door 33 are designed in such a manner as to adjust the ratio of the quantity of warm air flowing through the heater core 31 to the quantity of cold air flowing through the bypass air passage 32 by controlling or adjusting the flow direction of cold air discharged from an outlet portion 37 of the evaporator core 21. The outlet portion 37 is defined between the tip of a partition wall 36 and the lower end of the fan scroll casing 12.

When the air mix door (the sliding door) 33 is kept at its lowermost position shown in FIG. 2 during operation of the HVAC unit, the HVAC unit assures a full-cool mode. During the full-cool mode, the slide door 33 operates to close the inflow face of the heater core 31 and simultaneously direct or divert all of the evaporator core air (cold air) toward the bypass air passage 32. Conversely, when the slide door 33 is kept at its uppermost position, the HVAC unit operates at a full-hot mode. During the full-hot mode, the sliding door 33 fully closes the bypass air door 32 and simultaneously permits most of the evaporator core air (cold air) to pass through the heater core 31 to produce a large amount of heater core air (warm air). Then, the warm air flows through the downstream air duct T2 upwardly. Also, when the slide door 33 is kept at an intermediate position between the uppermost and lowermost positions, the heater core air (warm air) and the evaporator core air (cold air) are arbitrarily blended at a warm-air/cold-air ratio determined depending on the degree of opening of the slide door 33 kept at the intermediate position. In such a case, the arbitrarily blended air or conditioned air of a certain temperature flows upwards through the downstream air duct T2, and then flows toward the respective outlets, namely the vent outlet Ov, the defroster outlet Od, and the foot vent outlets (Of, Of), respectively formed in the conditioned-air duct T3 upwardly extending from the downstream end of the downstream air duct T2. Thereafter, the conditioned air is introduced into the vehicle compartment through the respective outlets. The conditioned-air duct T3 is defined in the HVAC unit case C in a manner so as to extend upwardly from the heater ore 31 and to extend above the upper portion of the volute fan scroll casing 12. The conditioned-air duct T3 serves to hermetically partly cover the blower fan unit 10 (particularly the panel face of the fan scroll casing 12 facing to the front passenger compartment), thereby effectively preventing undesired blower-fan motor noise from leaking outside of the HVAC unit.

Figure 4:
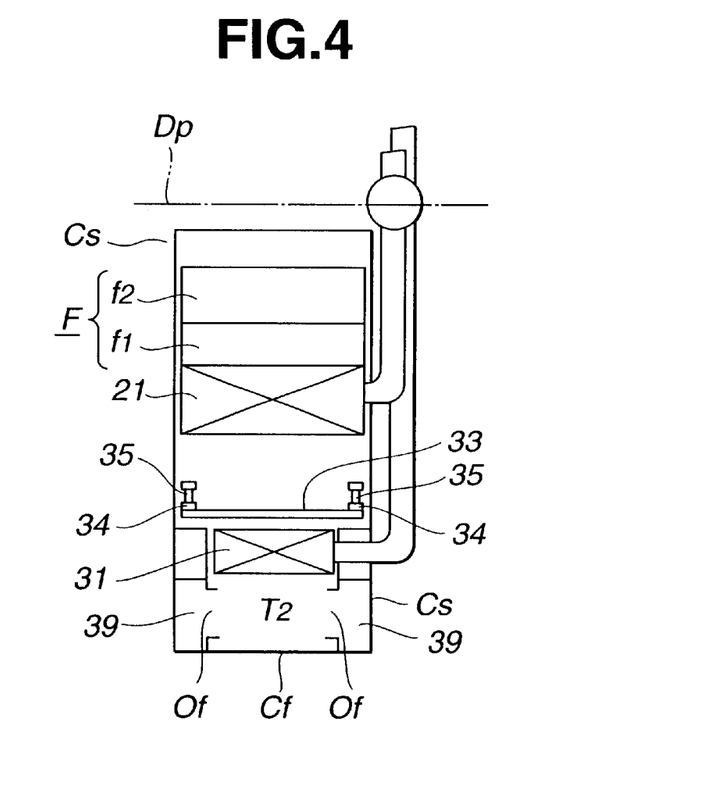
FIG. 4 is a lateral cross section illustrating the HVAC unit of the embodiment, taken along the line IV—IV of FIG. 2.

As described previously, according to the HVAC unit of the embodiment, the comparatively smaller heater core 31 and the comparatively larger evaporator core 21 are both disposed between the opposing side walls (Cs, Cs) of the fan scroll casing 12 (see FIGS. 2 and 4). Suppose the HVAC unit case C is contoured along both side walls of the evaporator core 21 and both side walls of the heater core 31, a pair of stepped side wall portions may be formed. According to the structure of the HVAC unit of the embodiment, the partitioned foot vent ducts (39, 39) are compactly formed in or built in the HVAC unit case C by utilizing the effectual spaces created by the dimensional difference between the comparatively larger evaporator core 21 and the comparatively smaller heater core 31. The built-in foot vent ducts (39, 39) avoid formation of such stepped side walls, and cooperate with the relatively smaller heater core 31 to ensure an entire width dimension as close to the overall width of the evaporator core assembly 20 as possible. As a result, the HVAC unit itself can be small-sized and simply formed as a substantially boxy shape. Such a small-sized boxy HVAC unit is convenient to handle specifically during packaging by a corrugated cardboard box. As previously described, the evaporator core 21 and the heater core 31 are arranged almost symmetrically and aligned with each other in the longitudinal direction of the HVAC unit case C. Actually, the two partitioned foot vent ducts (39, 39) are symmetrically compactly arranged at both sides of the downstream air duct T2, utilizing the previously-noted effectual spaces defined adjacent to the side walls (Cs, Cs) of the fan scroll casing 12 nearby both sides of the heater core 31. Thus, conditioned air can be distributed uniformly into a driver's seat side and an assistant's seat side. In the HVAC unit of the embodiment, a pair of inwardly-projecting temperature-adjustment ribs (38, 38) are further provided in the downstream air duct T2 nearby the upper end of the heater core 31 and attached to the forward wall Cf of the HVAC unit case C. Each of the temperature-adjustment ribs (38, 38) extends inwardly from the inner peripheral surface of the forward wall panel Cf of the HVAC unit case C in a manner as to be slightly inclined in the upstream direction with respect to a normal to the forward wall Cf. The inclination angle of each of the temperature-adjustment ribs (38, 38) is set at a predetermined acute angle which is effective to prevent cold air (evaporator core air) from being directly introduced into the foot vent outlets (Of, Of), while maintaining an increase in fluid-flow resistance of air flowing through the downstream air duct T2 at minimum. To provide a compact and boxy HVAC unit, the temperature-adjustment ribs (38, 38) are provided as close to the foot vent outlets (Of, Of) as possible. If the temperature-adjustment ribs are arranged away from the foot vent outlets, a space defined between backfaces of the temperature-adjustment ribs and the foot vent outlets functions as a wasteful undesirable air reservoir space during the foot vent mode. In the substantially boxy HVAC unit case structure having the built-in foot partitioned vent ducts (39, 39) of the embodiment, the inwardly-extending temperature-adjustment ribs (38, 38) are provided as close to the foot vent outlets (Of, Of) as possible, and the foot vent outlets (Of, Of) open so that the foot vent outlets (Of, Of) (communicating with the foot vent ducts (39, 39)) face to a space defined just downstream of the ribs (38, 38). Owing to the relative-position relationship among the heater core 31, the ribs (38, 38), and the foot vent outlets (Of, Of), during the foot vent mode, the heater core air (warm air) can be effectively guided by the ribs (38, 38) and smoothly delivered into the foot vent outlets (Of, Of). On the other hand, during HVAC system's operating modes except the foot vent mode, the ribs (38, 38) function to enhance an air mixing performance or to promote the blend of evaporator core and heater core air being fed into the passenger compartment. As clearly shown in FIG. 2, foot vent doors (Df, Df) are attached to the respective foot vent outlets (Of, Of) so that the foot vent outlets are opened and closed by means of the respective foot vent doors. A vent-defroster door Dvd is rotatably provided at the vent outlet Ov, in such a manner as to fully open the vent outlet Ov during the vent mode, and to fully close the vent outlet Ov and to admit conditioned air to be discharged through the defroster outlet Od into the vehicle compartment during the defrost mode. During the bi-level mode, the foot vent doors (Df, Df) are half opened, and at the same time the vent-defroster door Dvd is held at its full-open position where the vent outlet Ov fully opens, so as to admit cold air delivery to the vent outlet Ov and warm air delivery to the defroster outlet Od. The conditioned air flowing through the vent outlet Ov is discharged toward the upper half of the body of the vehicle occupant through a vent duct (not shown) communicating the vent outlet Ov. The conditioned air flowing through the defroster outlet Od is discharged toward the inside face of the windshield (front wind glass) through a defroster duct (not shown) communicating the defroster outlet Od. In FIG. 2, reference sign 40 denotes a drain pipe provided in the vicinity of the lower end of the partition wall 36 between the evaporator core assembly 20 and the heater core assembly 30, to drain water produced as a result of heat-exchanging action of the evaporator 21.

The operation of the HVAC module system of the embodiment is described in detail hereunder.

When the blower fan 11 is tuned on, the fresh-air/recirculation-air switching door 15 of the inside-air/outside-air switching box 14 is operated at either one of the inside-air introducing mode and the outside-air introducing mode depending on a selected discharge mode. When the inside-air introducing mode is selected, recirculation air is introduced through the outside air inlet 17 into the fan scroll casing 12. Conversely when the outside-air introducing mode is selected, fresh air is introduced through the inside air inlet 16 into the fan scroll casing 12. The air drawn into the fan scroll casing 12 by rotation of the blower fan 11 flows mainly along the inside face of the fan scroll casing, and then flows downwards through the upstream air duct T1. The flow velocity of air flowing through the inside face of the fan scroll casing 12 is suppressed by means of the slightly-slanted air-purifying filer F. The filter F ensures uniform air blow against the inflow face of the evaporator core 21, while maintaining an increase in fluid-flow resistance of air flowing through the upstream air duct T1 at minimum. For example, when the automobile air conditioner controller (not shown) is set at a maximum cooling mode in which the interior air is routed through the evaporator core 21, while the air mix door 33 moves down toward its shut-off position or the lowermost position (viewing FIG. 2) to seal off the heater core 31, the foot vent doors (Df, Df) are closed and the vent-defroster door Dvd is fully opened. In the maximum cooling mode, all of the cold air (evaporator core air) is routed toward within the bypass air passage 32. The cold air introduced into the bypass air passage 32 is further routed almost straight to the vent outlet Ov. Then, the cold air can be smoothly discharged toward the upper half of the body of the vehicle occupant via the vent outlet Ov. On the other hand, when the air conditioner controller is set at a maximum heating mode, the air mix door 33 moves up toward its uppermost position to admit most of air passing through the evaporator core 21 to be routed through the heater core 31. In the maximum heating mode, the foot vent doors (Df, D f) are opened, while the vent-defroster door Dvd is closed. Warm air is discharged from the heater core 31 via the temperature-adjustment rib pair (38, 38) through the foot vent outlets (Of, Of) and the foot vent ducts (39, 39), and then delivered uniformly into the driver's foot space and the assistant's foot space. In a heating mode with a desired in-car temperature selected by the driver, the air mix door 33 is held at a computer-controlled, intermediate position between the uppermost and lowermost positions to effectively bend evaporator core air (cool air) and heater core air (warm air) being fed into the passenger compartment. Properly temperature-blended conditioned-air is fed via the temperature-adjustment rib pair (38, 38) through the foot vent outlets (Of, Of) into the foot vent ducts (39, 39). Conversely, in a cooling mode with a desired in-car temperature selected by the driver, the air mix door 33 is held at a computer-controlled, intermediate position between the uppermost and lowermost positions to admit part of evaporator core air (cool air) to be routed through the bypass air passage 32 and to admit the remaining evaporator core air to be routed through the heater core 31. The heater core air flows upwards through the downstream air duct T2. The heater core air is directed toward the bypass air passage 32 by means of the temperature-adjustment ribs (38, 38), and thus forcibly pushed into the cold air flowing through the bypass air passage 32. This enhances the air mixing performance, and insures conditioned air suitably temperature-blended at the desired temperature. As a result, the properly temperature-blended air can be discharged into the vehicle compartment through the vent outlet Ov. When the defrost mode is selected, the vent-defroster door Dvd is set at the closed position, the foot vent doors (Df, Df) are set at their half-open positions, and the air mix door 33 is kept at its upper position. Thus, air passing through the evaporator core 21 is routed through the heater core 31. A part of the heater core air (warm air) is delivered via the foot vent outlets (Of, Of) into the foot vent ducts (39, 39). The remaining heater core air flows upwards through the downstream air duct T2, and flows along the outer peripheral wall surface of the fan scroll casing 12, and then blows against the inside wall surface of the windshield through the defroster outlet Od.

As will be appreciated from the above, according to the compact boxy HVAC unit of the invention, even when the evaporator core 21 is arranged along a stream line of air flowing through the blower fan unit 10, it is possible to suppress diversion of the course of a stream of air discharged from the blower fan 11 toward only the inside face of the fan scroll casing 12 by means of the slanted air-purifying filter F, thus ensuring uniform air blow against the inflow face of the evaporator core 21, while maintaining an increase in fluid-flow resistance of air flowing through the upstream air duct at minimum. This effectively reduces the increase in fluid-flow resistance and noise and vibrations, thus reducing energy loss and insuring an enhanced cooling performance, although the HVAC unit of the invention is manufactured as a comparatively small-sized, boxy HVAC module assembly.

In the shown embodiment, although the filter element f2 of the air-purifying filter F is made of zigzag nonwoven fabric, the filter element f2 may be formed an electro-adhesion type filter element. In the HVAC unit of the embodiment, the slanted air-purifying filter F is formed as a full-face filter hermetically covering all around the inflow face of the evaporator core 21. Alternatively, the slanted air-purifying filter F may be formed as a part-face filter partially covering the inflow face of the evaporator core 21. However, the full-face filter is superior to the part-face filter from a view point of a cooling performance or uniform air blow against the inflow face of the evaporator.

In the shown embodiment, the evaporator core assembly 20 is located directly below the blower fan unit 10, for enhanced supporting rigidity. The evaporator core assembly may be slightly properly offset from the blower fan unit 10 in the fore-and-aft direction.

While the foregoing is a description of the preferred embodiments carried out the invention, it will be understood that the invention is not limited to the particular embodiments shown and described herein, but that various;changes and modifications may be made without departing from the scope or spirit of this invention as defined by the following claims.

What is claimed is:

1. An automobile heating, ventilation, and air conditioning unit, comprising:

a heating, ventilation, and air conditioning unit case permitting flow of interior air;

a blower fan unit having at least a blower fan for introducing air into said unit case;

an evaporator core assembly having an evaporator core disposed in said unit case for taking heat from the air discharged from the blower fan to produce cool air;

a heater core assembly having a heater core disposed in said unit case downstream of the evaporator core for adding heat to the cool air to produce warm air;

a bypass air passage bypassing the heater core;

an air mix door disposed between the evaporator core and the heater core for controlling a percentage of the cool air passing through said bypass air passage and the warm air produced by the heater core, depending on a degree of opening of said air mix door;

said unit case defining an upstream air duct in said unit case upstream of the evaporator core for routing the air discharged from the blower fan toward the evaporator core; and an air-purifying filter slanted and arranged in the upstream air duct, so that an upstream end of said air-purifying filter is supported by an upper supporting portion fixedly connected to said unit case for supporting the evaporator core and so that a downstream end of said air-purifying filter is located away from a lower end of the evaporator core.

2. The automobile heating, ventilation, and air conditioning unit, as claimed in claim 1, wherein said air-purifying filter comprises a full-face filter which covers an inflow face of the evaporator core.

3. The automobile heating, ventilation, and air conditioning unit, as claimed in claim 1, wherein said blower fan unit is arranged in a substantially upper half of said unit case, the evaporator core of said evaporator core assembly is located directly below said blower fan unit, a bottom end of said blower fan unit is supported by the upper supporting portion of the evaporator core, the upstream end of said air-purifying filter is mounted on the upper supporting portion and the downstream end of said air-purifying filter is mounted on an inner peripheral wall of said unit case, whereby said unit case, said air-purifying filter, and said evaporator core cooperate with each other to form a substantially triangular supporting structure for said blower fan unit.

4. The automobile heating, ventilation, and air conditioning unit, as claimed in claim 1, wherein said unit case includes a fan scroll casing accommodating therein the blower fan, and a substantially rectangular parallelopiped portion extending in a downstream direction from an air outflow side of the fan scroll casing, said substantially rectangular parallelopiped portion is constructed by a pair of side walls, and a backward wall and a forward wall both connected to the side walls to form a U-turn air-flow passage, the evaporator core is located upright at a U-turn portion of the U-turn air-flow passage, the heater core is dimensioned to be smaller than the evaporator core in both height and width dimensions and located upright and downstream of and substantially parallel to the evaporator core, and which further comprises at least one foot vent duct partitioned and formed in said unit case utilizing a dimensional difference between the evaporator core and the heater core and at least one temperature-adjustment rib inwardly projecting from an inner peripheral wall surface of the forward wall of said unit case above the heater core, and wherein the at least one temperature-adjustment rib is provided adjacent to a foot vent outlet communicating the at least one foot vent duct, so that the foot vent outlet faces to a space defined just downstream of the at least one temperature-adjustment rib.

5. The automobile heating, ventilation, and air conditioning unit, as claimed in claim 4, wherein the evaporator core is located upright directly below said blower fan unit.

6. The automobile heating, ventilation, and air conditioning unit, as claimed in claim 4, wherein the heater core is disposed in said unit case so that an upper end of the heater core is at a level lower than an upper end of the evaporator core.

7. An automobile heating, ventilation, and air conditioning unit, comprising:

a heating, ventilation, and air conditioning unit case permitting flow of interior air;

a blower fan unit having at least a blower fan for introducing air into said unit case;

an evaporator core assembly having an evaporator core disposed in said unit case for taking heat from the air discharged from the blower fan to produce cool air;

a heater core assembly having a heater core disposed in said unit case downstream of the evaporator core for adding heat to the cool air to produce warm air;

a bypass air passage bypassing the heater core;

an air-mix sliding door disposed between the evaporator core and the heater core for controlling a percentage of the cool air passing through said bypass air passage and the warm air produced by the heater core, depending on a degree of opening of said air-mix sliding door; and said unit case including a fan scroll casing accommodating the blower fan in the fan scroll casing, and a substantially rectangular parallelopiped portion extending in a downstream direction from an air outflow side of the fan scroll casing, said substantially rectangular parallelopiped portion being constructed by a pair of side walls, and a backward wall and a forward wall both connected to the side walls to form a U-turn air-flow passage;

wherein the evaporator core is located upright at a U-turn portion of the U-turn air-flow passage, the heater core is dimensioned to be smaller than the evaporator core in both height and width dimensions and located upright and downstream of and substantially parallel to the evaporator core, and which further comprises at least one foot vent duct partitioned and formed in said unit case utilizing a dimensional difference between the evaporator core and the heater core and at least one temperature-adjustment rib inwardly projecting from an inner peripheral wall surface of the forward wall of said unit case above the heater core, and wherein the at least one temperature-adjustment rib is provided adjacent to a foot vent outlet communicating the at least one foot vent duct, so that the foot vent outlet faces to a space defined just downstream of the at least one temperature-adjustment rib.

8. The automobile heating, ventilation, and air conditioning unit, as claimed in claim 7, wherein said unit case has an upstream air duct upstream of the evaporator core for routing the air discharged from the blower fan toward the evaporator core, and which further comprises an air-purifying filter slanted and arranged in the upstream air duct, so that an upstream end of said air-purifying filter is supported by an upper supporting portion fixedly connected to said unit case for supporting the evaporator core and so that a downstream end of said air-purifying filter is located away from a lower end of the evaporator core.

9. The automobile heating, ventilation, and air conditioning unit, as claimed in claim 8, wherein the evaporator core is located upright directly below said blower fan unit.

10. The automobile heating, ventilation, and air conditioning unit, as claimed in claim 8, wherein the heater core is disposed in said unit case so that an upper end of the heater core is at a level lower than an upper end of the evaporator core.

* * * * *